(12) United States Patent
Hunt et al.

(10) Patent No.: US 9,746,215 B2
(45) Date of Patent: Aug. 29, 2017

(54) HEAT POWERED RECIPROCATING PISTON ENGINE

(71) Applicant: Thermanalysis Engineering Corp., Rosenberg, TX (US)

(72) Inventors: Robert A. Hunt, Rosenberg, TX (US); Ivo M. Dabelic, Friendswood, TX (US)

(73) Assignee: Thermanalysis Engineering Corp., Rosenberg, TX (US)

( * ) Notice: Subject to any disclaimer, the term of this patent is extended or adjusted under 35 U.S.C. 154(b) by 493 days.

(21) Appl. No.: 13/652,235

(22) Filed: Oct. 15, 2012

(65) Prior Publication Data

US 2013/0091884 A1    Apr. 18, 2013

Related U.S. Application Data

(60) Provisional application No. 61/547,105, filed on Oct. 14, 2011.

(51) Int. Cl.
| | |
|---|---|
| F25B 27/00 | (2006.01) |
| F25B 30/02 | (2006.01) |
| F25B 27/02 | (2006.01) |
| F01K 23/10 | (2006.01) |
| F22B 1/18 | (2006.01) |

(52) U.S. Cl.
CPC ............. F25B 30/02 (2013.01); F01K 23/10 (2013.01); F22B 1/1815 (2013.01); F25B 27/005 (2013.01); F25B 27/02 (2013.01)

(58) Field of Classification Search
CPC ........ F25B 27/00; F25B 27/02; F25B 29/003; F25B 30/06; F25B 2400/14; F25B 7/00; F25B 11/00; Y02B 30/12; F22B 1/006; F03G 6/00; F03G 6/001; F03G 6/003; F01L 17/00
USPC .......... 62/238.1–238.7, 323.1–323.4; 91/313, 91/328
See application file for complete search history.

(56) References Cited

U.S. PATENT DOCUMENTS

| | | | | |
|---|---|---|---|---|
| 16,358 | A * | 1/1857 | Fletcher | F01B 17/00 |
| | | | | 91/313 |
| 2,637,981 | A * | 5/1953 | Russell | F25B 27/00 |
| | | | | 62/203 |
| 3,586,129 | A * | 6/1971 | Cass | F16N 37/003 |
| | | | | 184/27.4 |
| 3,823,573 | A * | 7/1974 | Cassady | F04B 13/02 |
| | | | | 62/116 |
| 3,839,863 | A | 10/1974 | Frazier | |
| 3,861,166 | A * | 1/1975 | Goldsberry | 62/115 |
| 3,894,405 | A * | 7/1975 | Mielitz | F04B 3/003 |
| | | | | 417/231 |
| 3,960,322 | A | 6/1976 | Ruff et al. | |
| 4,068,476 | A | 1/1978 | Kelsey | |

(Continued)

*Primary Examiner* — Etsub Berhanu
*Assistant Examiner* — Jose O Class-Quinones
(74) *Attorney, Agent, or Firm* — Patrick K. Steele

(57) ABSTRACT

A thermodynamic system for powering a reciprocating device includes a refrigerant passing in a closed loop between a refrigerant compressor, a condenser, an expansion valve, and an evaporator. The system includes a heat source for heating the refrigerant, and an engine for receiving the heated refrigerant. The engine includes a housing, a shaft axially movable within the housing, a piston attached to the shaft, a shifter for reversing piston direction, and porting for passing the refrigerant into and out of the engine housing.

14 Claims, 4 Drawing Sheets

(56) References Cited

U.S. PATENT DOCUMENTS

| | | | |
|---|---|---|---|
| 4,080,801 A * | 3/1978 | Post | 62/238.4 |
| 4,103,493 A | 8/1978 | Schoenfelder | |
| 4,178,989 A | 12/1979 | Takeshita et al. | |
| 4,266,404 A * | 5/1981 | ElDifrawi | 62/79 |
| 4,367,633 A * | 1/1983 | Strathman | 62/236 |
| 4,398,396 A * | 8/1983 | Schmerzler | 62/116 |
| 4,459,814 A | 7/1984 | Schaetzle | |
| 4,571,952 A | 2/1986 | Greenfield | |
| 4,720,978 A | 1/1988 | Spacer | |
| 4,739,620 A | 4/1988 | Pierce | |
| 4,765,144 A | 8/1988 | Spacer | |
| 4,779,427 A * | 10/1988 | Rowley et al. | F02G 1/04 62/116 |
| 5,246,350 A | 9/1993 | Lackstrom et al. | |
| 5,275,014 A | 1/1994 | Solomon | |
| 7,340,899 B1 | 3/2008 | Rubak et al. | |
| 7,426,836 B2 | 9/2008 | Jmaev | |
| 7,464,675 B1 * | 12/2008 | Schechter | 123/90.15 |
| 7,536,861 B2 | 5/2009 | Walpita | |
| 7,621,129 B2 | 11/2009 | DuBois | |
| 7,726,129 B2 | 6/2010 | Driver | |
| 7,779,635 B2 | 8/2010 | Lin | |
| 7,845,345 B2 | 12/2010 | Glazer et al. | |
| 7,877,999 B2 | 2/2011 | Nuel et al. | |

\* cited by examiner

HEAT POWERED RECIPROCATING PISTON ENGINE

CROSS-REFERENCE TO RELATED APPLICATION

This application claims the priority from U.S. Provisional Application No. 61/547,105 filed on Oct. 14, 2011, the disclosure of which is incorporated herein by reference for all purposes.

FIELD OF THE INVENTION

This invention relates to heat powered reciprocating piston engine capable of powering a compressor, a pump, an alternator, or any device using reciprocating power. The piston engine is particularly suitable for use at sites where electrical power is unavailable and at sites where waste heat is available.

BACKGROUND OF THE INVENTION

Rankin cycle heat driven engines such as automobile engines have been available for years. Successful hydrocarbon combustion engines have reached efficiencies upward of 40% have been critical in the industrial development over the past century. The heat driven engine proposes to utilize a portion of this waste heat to drive all auxiliary equipment such as air condition, generator, and hydraulic systems on mobile and stationary engines. Although hybrid power systems are improving car mileage, the removal of energy consuming auxiliary systems will become critical to greater efficiency.

The power from gas turbine systems increases with inlet air temperature drop. Because gas turbines provide a significant percent of the world's electrical power, effort has been underway for decades to improve their power output efficiency. By utilizing turbine exhaust heat to power the heat engine which can drive a reciprocating refrigeration system, inlet air can be chilled, thereby increasing generator output.

Because of environmental effects changes in fluorocarbon compounds have affected air conditioning efficiencies, efforts have been made to improve the operation and efficiency of the compressor, condenser, evaporator, and components of these systems. Energy costs are increasing and are anticipated to continue to increase. Use of "free" energy, such as solar or wind, are increasingly attractive. Providing a solar heat driven reciprocating piston engine to power a refrigeration compressor to augment an existing air conditioning system can greatly reduce the electrical energy requirements.

U.S. Pat. No. 5,275,014 discloses a heat pump system which employs a diaphragm attached to the face of the piston. Diaphragms of this type do not reliably work in heat pump systems over time due to the repeated flexing of the diaphragms and the ability of the refrigerants to escape from the system through a very small crack. U.S. Pat. No. 4,765,144 discloses a solar powered pumping engine suitable for use in oil field pumping. Other patents of interest include U.S. Pat. Nos. 3,839,863, 3,960,322, 4,068,476, 4,103,493, 4,178,989, 4,459,814, 4,571,952, 4,720,978, 4,739,620, 7,340,899, and 7,426,836.

U.S. Pat. No. 7,536,861 discloses a solar heat engine system, and U.S. Pat. No. 5,246,350 discloses a solar powered pumping system. U.S. Pat. No. 7,877,999 discloses an environmental heating and cooling system, and U.S. Pat. No. 7,845,345 discloses a solar-powered system for providing utilities. A solar energy powered generator is disclosed in U.S. Pat. No. 7,779,635, and a stirling cycle engine is disclosed in U.S. Pat. No. 7,726,129. U.S. Pat. No. 7,621,129 discloses another version of a geothermal power system.

The disadvantages of the prior art are overcome by the present invention, an improved heat powered reciprocating engine is hereinafter disclosed.

SUMMARY OF THE INVENTION

In one embodiment, a thermodynamic system is provided for powering a reciprocating device. A thermodynamic system includes a refrigerant passing in a closed loop between a compressor, a condenser, an expansion valve, and an evaporator. A thermodynamic system further comprises a heat source for heating the refrigerant, and an engine for receiving the heated refrigerant. The engine including a housing, a shaft axially movable within the housing, a piston attached to the shaft, a shifter for reversing piston direction, and ports for passing refrigerant into and out of the engine housing.

These and further features and advantages of the present invention will become apparent from the following detailed description, wherein reference is made to the figures in the accompanying drawings.

DETAILED DESCRIPTION OF PREFERRED EMBODIMENTS

Gas turbine electrical power generation systems provide an excellent application for the heat engine. Turbine power output increases with turbine inlet air temperature. A reduction in inlet temperature of approximately 20 degrees F. produces an increase of 5% in the turbine power output. Because gas turbines provide a significant share of the worlds' electrical power, improving their power output efficiency is highly desirable. By utilizing turbine exhaust heat to power the proposed heat engine which drives a reciprocating refrigeration system, an inlet air chiller results in increased generator output.

Figure 1:
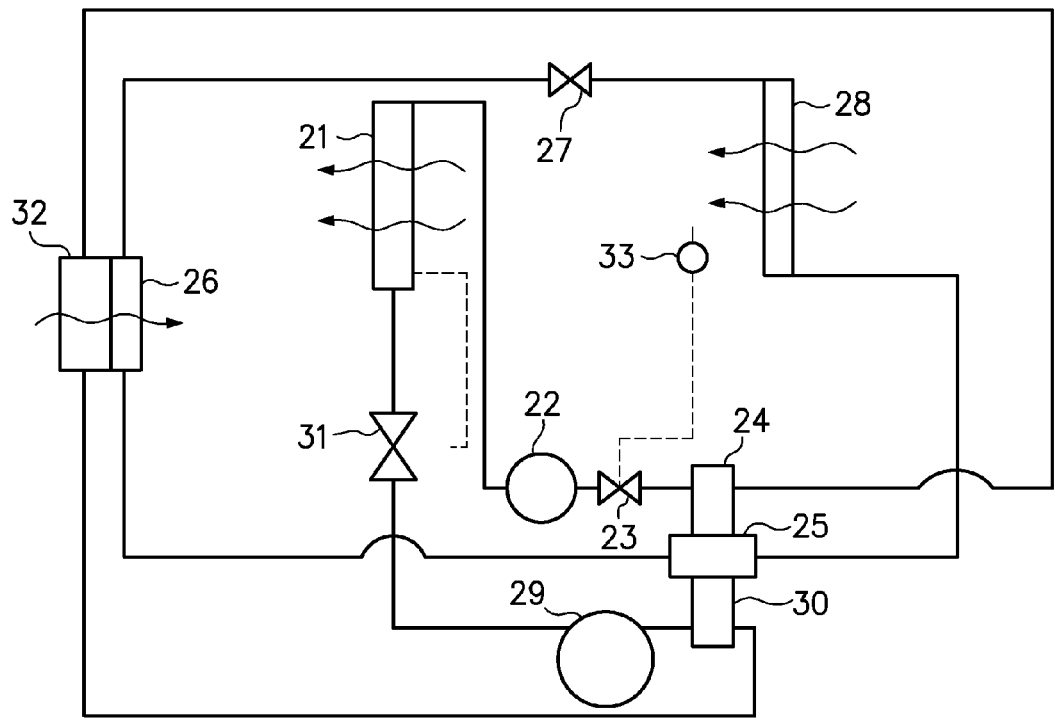
FIG. 1 is a block diagram of the heat powered reciprocating piston engine powering a gas turbine system. Inlet air to the gas turbine inlet air chilling system is chilled by the piston engine to increase generator output.

Referring to FIG. 1, the cycle begins in the "boiler" 21, which is a tube bundle which lines the inside of the turbine exhaust stack. The boiler is utilized to boil a refrigerant. As heat energy is added, the refrigerant elevates in temperature and pressure. The gas is collected in the gas surge tank 22 where it is fed into the inlet of the heat engine 24 through a temperature actuated control valve 23. The engine 24 drives a refrigeration compressor 25 which compresses the cooling refrigerant to high pressure. The discharge of the heat engine goes to the condenser 32 where it is liquefied and is pumped to the liquid surge tank 29 through pump 30. The liquid surge tank 29 supplies high pressure liquid refrigerant to the boiler 21 which is controlled by pressure control valve 31 where the cycle repeats. The work added to compress the gas in compressor 25 elevates its temperature which is removed in a condenser 26 and the compressed gas is liquefied. The discharge from the condenser 26 feeds the evaporator 28 through expansion valve 27 that chills the inlet turbine air. The discharge of the evaporator 28 returns to the compressor 25 to repeat the cycle. Condenser 32 condenses the gas to a liquid. Temperature control 33 supplies a control signal to control valve 23.

Figure 2:
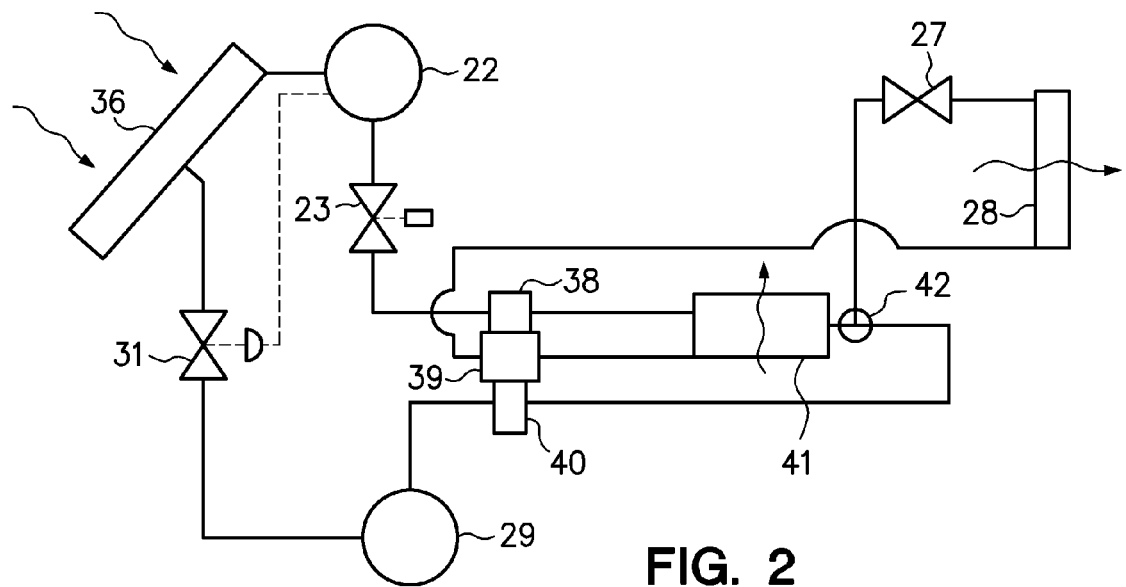
FIG. 2 is a diagram of the heat powered reciprocating piston engine powering the compressor of a refrigerant system.

Referring now to FIG. 2, the reciprocating piston engine of the present invention may also be used to increase the efficiency of an air conditioning system. More particularly, a parabolic solar collector 36 boils the refrigerant which powers the reciprocating piston engine 38, which in turn powers a piston compressor 39 and a fluid pump 40. Exhaust from the engine passes through a condenser 41 where the exhaust gases liquefy. The DC powered condenser fan 42 may be powered by a solar panel. Refrigerant is passed through the pump and returned to the solar collector 36 and the cycle is repeated.

In FIG. 2, the solar collector 36 boils the refrigerant, which powers the reciprocating piston engine 38, which drives the piston compressor 39 and the fluid pump 40. Liquid refrigerant is passed through the pump 40 and returned to the solar collector where the cycle is repeated. Gas surge tank 22, expansion valve 27, evaporator 28, liquid surge tank 29, liquid control valve 31, and control valve 23 each serve a similar purpose to the same components in FIG. 1. The refrigerant compressor may be connected in parallel to an existing air conditioning system to provide supplemental cooling. The system of the present invention may provide a significant increase to the primary system cooling capacity, which should be as much as 50% when the temperature is hot and the sun is shining. The system of the present invention may be skid mounted requiring only a connection to an existing refrigerant system.

As explained more fully below, the engine includes a one-piece cylinder with movable parts internal of the cylinder. The engine is fluidly connected to the solar connector on one side and the condenser on the other by conventional piping. When the heat sun is adequate to boil the refrigerant, the engine will start. More sunshine results in greater cooling and enhanced efficiency for the refrigerant system. By utilizing the engine powered by the sun's heat, the powering of a rotary air conditioning compressor may be eliminated or reduced.

The system will have supplemental power, either from an electrically-driven compressor operating in parallel with the heat-driven compressor or from a gas-fired boiler operating in parallel with the solar boiler. The unit may be used as an air conditioner in summer and a heater in winter. There need not be a moving shaft penetrating the pressure shell; the engine compressor pump (ECP) may be hermetically sealed to prevent leakage of refrigerant.

The environmental impact this air conditioner would avoid over time, compared to a standard unit, far exceeds the impact of a complete refrigerant leak. The ECP's ability to retain its refrigerant or use a less harmful form will be important. Condenser and evaporator temperatures are set by environment and by cooling needs, while boiler temperature must be set by a balance between solar boiler efficiency and engine efficiency.

The ECP has a double-acting engine driving a double-acting compressor and a single-acting pump. Work is transmitted by the piston rod with no rotary motion. Compressor and pump flows are controlled by check valves, while engine flows are controlled by an internal shifter. The shifter valve driven 18 by control logic using data from a rod position sensor. Since engine cylinder pressure decreases as compressor cylinder pressure increases, the design must make use of piston inertia to complete the compression process.

Figure 3:
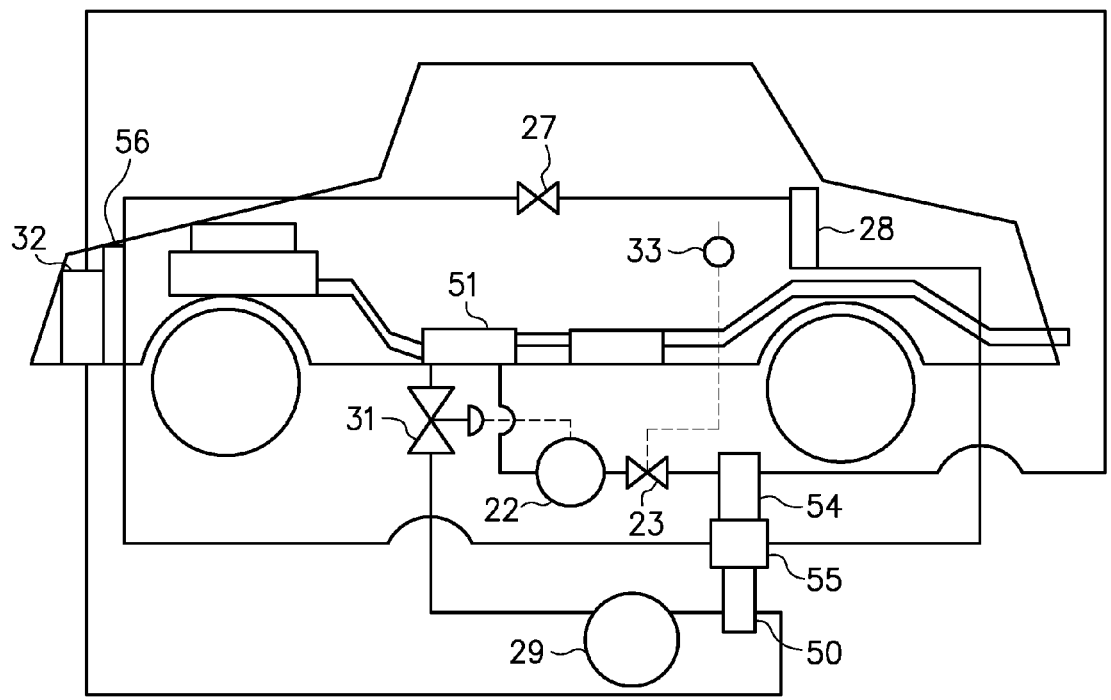
FIG. 3 is a diagram of a reciprocating piston engine utilizing waste heat from an automobile to power the compressor or other device on the vehicle.

Referring now to FIG. 3, a waste heat driven engine 54 utilizes waste heat from the vehicle radiator and exhaust systems to power auxiliary equipment, such as air conditioning, generator, and hydraulic systems on a mobile or a stationary engine. Boiled fluorocarbon gas will drive a reciprocating cylinder. The exit gas is cooled to a liquid in a condenser, its pressure elevated in a piston pump driven by the engine, and returned to the boiler where it repeats for another cycle. As hybrid power systems are improving car mileage numbers the removal of energy hungry auxiliary systems will become critical.

The cycle begins by heating a refrigerant within an exhaust heat exchanger or boiler 51 utilizing the engine exhaust gas. The boiler 51 boils a refrigerant. As heat energy is added, the refrigerant elevates in temperature and pressure. The gas is collected in the gas surge tank 22 where it is fed into the inlet of the heat engine 54 through a temperature actuated control valve 23. The engine 54 drives a refrigeration compressor 55 which compresses the cooling refrigerant to high pressure. The discharge of the heat engine goes to the condenser 32 where it is liquefied and is pumped to the liquid surge tank 29 through pump 50. The liquid surge tank 29 supplies high pressure liquid refrigerant to the boiler 51 which is controlled through pressure control valve 31, where the cycle repeats. The work added to compress the gas in compressor 55 elevates its temperature which is removed in condenser 56 where the compressed gas is liquefied. The discharge of the condenser 56 feeds the evaporator 28 through expansion valve 27 that chills the automobile air. The discharge of the evaporator 28 returns to the compressor 55 to repeat the cycle. The reciprocating engine can power a hydraulic system for power brakes and steering, or may power an alternator to power the vehicle electrical systems.

Figure 4:
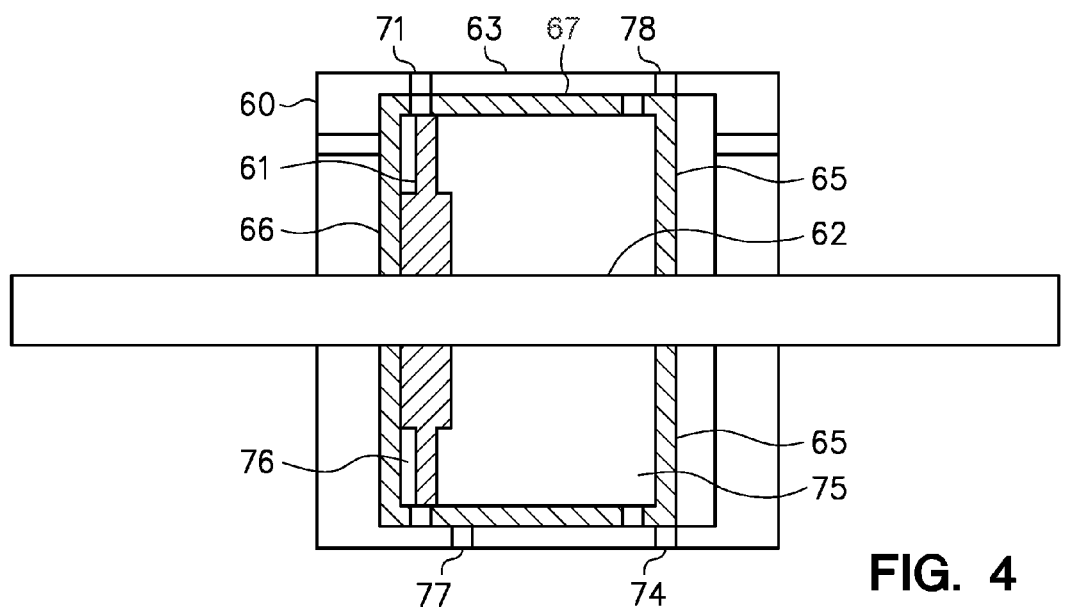
FIG. 4 is a detailed cross-sectional view of the reciprocating piston engine according to the present invention.

FIG. 4 illustrates in greater detail a suitable engine 60 according to the present invention. The piston 61 is attached to a shaft 62, with the piston and shaft positioned within an outer housing 63. The engine shifter assembly 67 may have various configurations, as discussed below. The end plates 65 and 66, and the engine shifter 67 connecting the plates, move as an assembly within the housing 63. Gas pressure is applied to the shifter chambers 75 and 76 through slider valve 68 (shown in FIG. 5) by inlet 69 passing through the slider valve 68 (shown in FIG. 5) and into ports 70 and 73. Depending on the slider valve 68 (shown in FIG. 5) position, the shifter assembly 67 directs working gas into the cylinder areas through ports 71 and 77 pushing the piston 61 to the right or left where it is held by the pressurized gas. Gas is exhausted from the cylinder areas where it returns back to the condenser through ports 74 and 78. The piston pushes the shifter assembly 67 discussed subsequently at the end of each stroke which reverses the supply and exhaust ports to reverse the piston direction. The shifter allows the entire engine to be sealed, thereby reducing the possibility of refrigerant leakage.

One end of the shaft may be utilized to pump the refrigerant which is liquefied in the condenser back to the solar collector. The pump may be required because the solar collector is above the engine operating pressure. Liquid flow may be directed by check valves, and a pressure controller is utilized to control the engine and gas flow and ensure sufficient gas for operation. The compressor has a piston smaller in diameter than the piston engine to provide an increase in pressure necessary for the cooling cycle. Check valves provide for one way flow in the cooling system.

Figure 5:
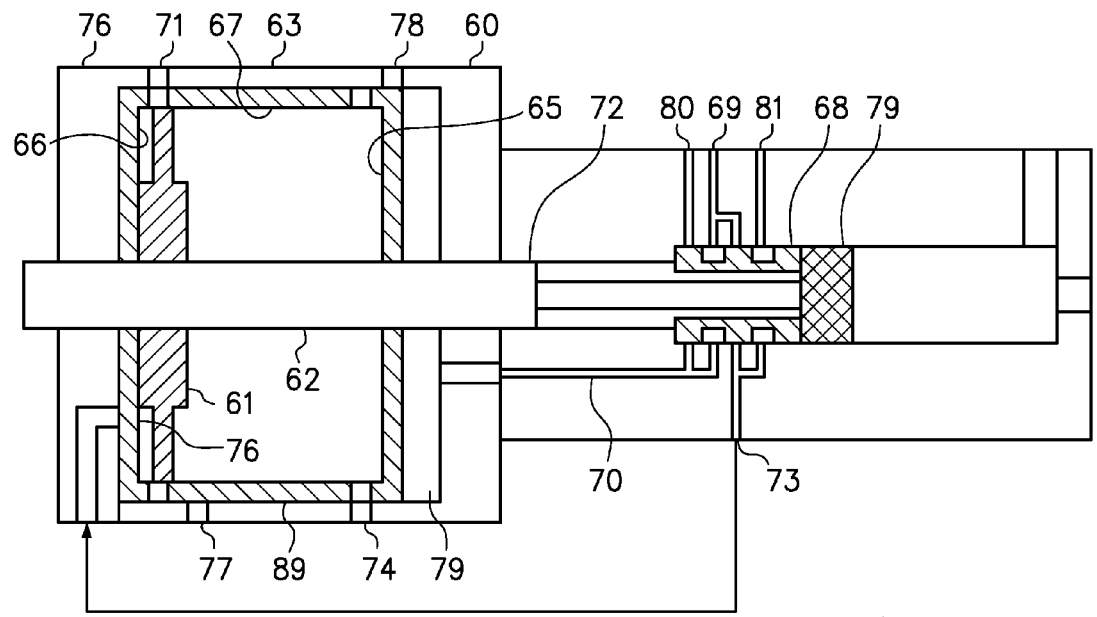
FIGS. 5-7 illustrate the sequential operation and porting of the reciprocating piston engine and shifter.
Figure 6:
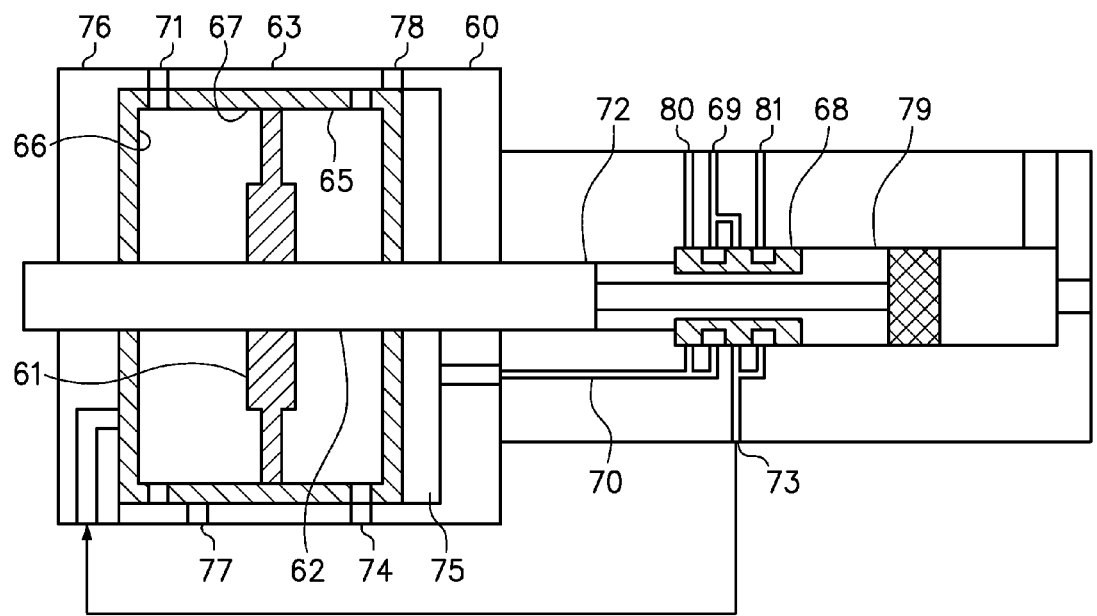
Figure 7:
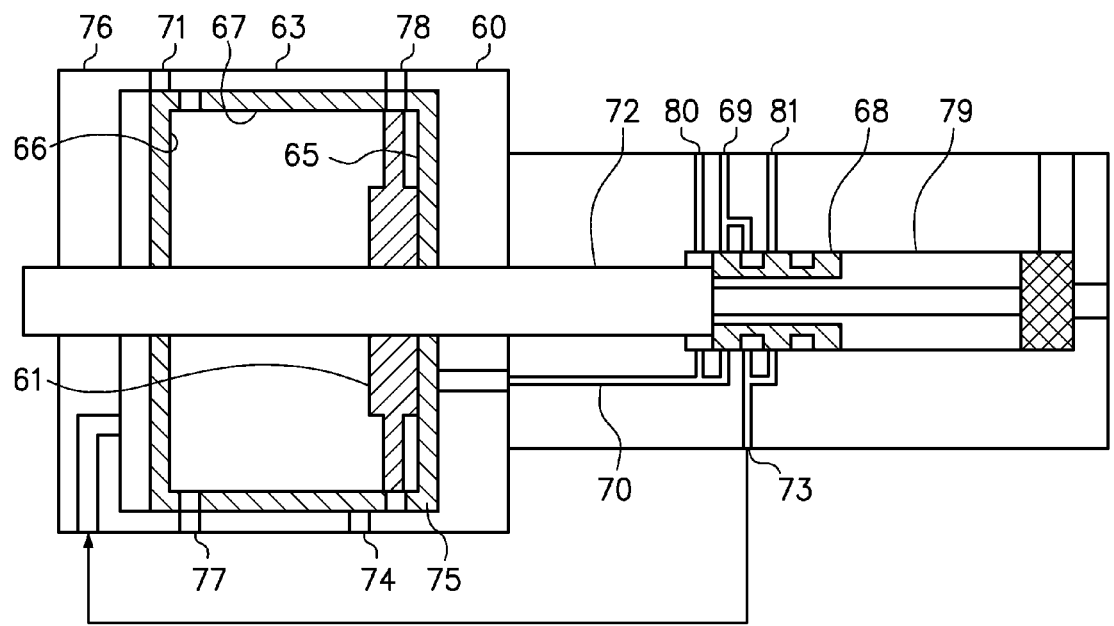

FIG. 5-7 illustrate the sequence of operation of the heat engine. The engine start position is shown in FIG. 5. The piston 61 and shaft 62 assemblies are in the retracted left position. The engine shifter 67 and the slider valve 68 are also in the left position. Operating gas pressure holds the engine shifter 67 in the left position through the slider valve 68 and ports 69 and 70. When operation of the engine is desired, gas pressure is introduced into the heat engine outer housing 63 through port 71. The piston 61 and shaft 62 move to the right as shown in FIG. 6. The slider valve 68 remains unmoved as the shaft 62 passes through it. Slightly before the piston 61 reaches an wall 65 of engine shifter 67, the enlarged portion 72 of the shaft 62 strikes the slider valve 68. As the enlarged portion 72 of the shaft 62 continues to travel right, it shifts the slider valve 68 to the right as shown in FIG. 7. When the slider valve 68 shifts, it redirects port 69 shutting off gas flow to the right side of the shifter 75 while opening the right side to the exhaust line to exhaust port 80. At the same time, the shifted slider valve 68 closes the left side shifter vent 81 and opens the gas flow into the left side 76 of the shifter assembly 67, causing the shifter assembly 67 to shift to the right. This realigns the shifter assembly 67, isolating ports 71 and 77, and opening ports 78 and 74 passing gas pressure to the right side of the piston 61. The piston 61 travels left reversing the sequence until the pump piston 79 shifts the slider valve 68 to the left reversing all slider valve ports. This cycle repeats until gas pressure is shut off.

Figure 8:
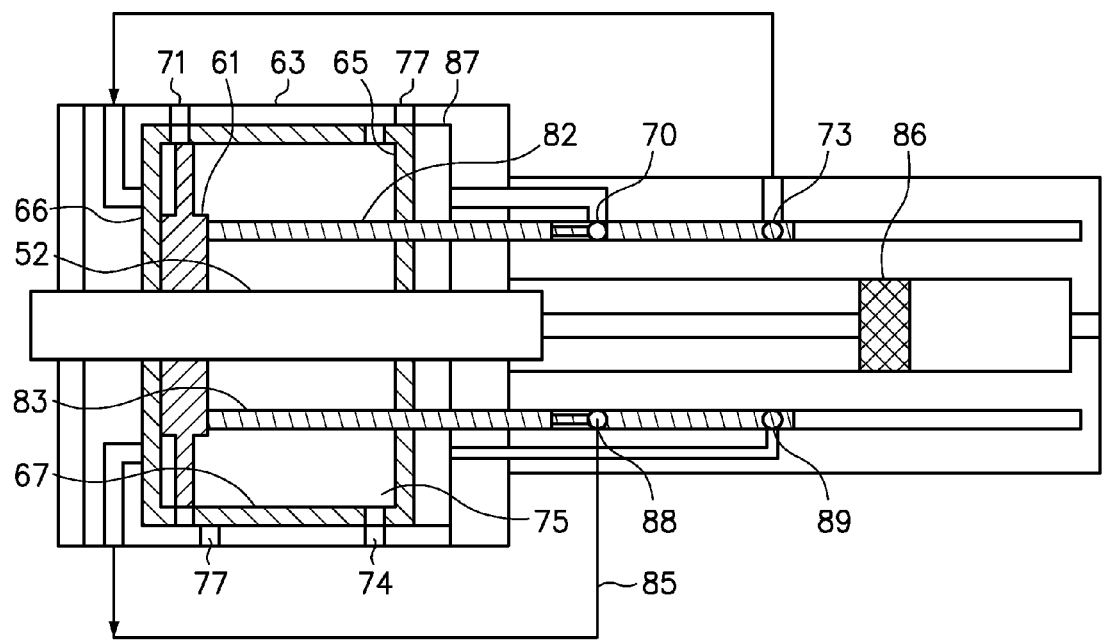
FIG. 8 is another embodiment at a heat powered reciprocating piston engine.

FIG. 8 illustrates controlling the shifter 67 using two control rods 82 and 83. Control rod 82 controls the shifter end pressure, and control rod 83 controls the shifter end exhaust.

The engine start position is shown in FIG. 8. The piston 61 and shaft 62 assemblies are in the retracted left position. The engine shifter assembly 67 and both control rods 82 and 83 are also in the left position. Operating gas pressure flows through control rod 82, which is undercut at 70 into the right shifter void 87, thereby holding the shifter in the left position. Control rod 83 is also in the left position allowing the undercut area 88 to vent gas pressure on the left shifter 67 end through the pipe 85.

When operation of the engine is desired, gas pressure is introduced into the heat engine outer cylinder 63 through port 71. The piston 61 and shaft 62 move to the right. As the shaft 62 continues to travel right, the control rods 82 and 83 also move right until pressure ports 73 and 89 are reached. Port 89 exhausts the pressure in the shifter right void 87 and pressure is introduced into the shifter left void (between the left plate 66 and the piston 61) through pressure port 73. Shifter 67 shifts to the right, shutting off the left gas supply 71 and opening the right side gas supply 77. Simultaneously, the shifter closes the right side gas exhaust opening 74 and opens the lift side gas exhaust opening 78. Piston 61 and shaft 62 then return to the start position and the cycle repeats.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A thermodynamic system for powering a reciprocating device, the thermodynamic system including a refrigerant passing in a closed loop between a refrigerant compressor, a condenser, an expansion valve, and an evaporator, the thermodynamic system further comprising:
   a heat source for heating the refrigerant; and
   an engine for receiving the heated refrigerant, the engine including a housing and an engine shifter assembly, wherein the engine shifter assembly comprises a ported engine shifter, and said engine shifter assembly is movable between a first position and a second position,
   the engine further comprises a shaft having a first end and an enlarged second end, the shaft axially movable through the housing between a third position and a fourth position,
   the ported engine shifter being located and movable within the housing between the first position and the second position,
   an engine piston attached to the shaft within the ported engine shifter and movable with the shaft between a fifth position and a sixth position, at least one first housing port in the housing alignable with at least one first engine shifter port in the engine shifter for passing the heated refrigerant into the housing and into the engine shifter to displace the engine piston in a first direction relative to the housing and at least one second housing port in the housing alignable with at least one second engine shifter port in the engine shifter for passing the heated refrigerant into the housing and into the engine shifter to displace the engine piston in a second direction relative to the housing;
   wherein the shifter assembly is connected to a slider valve that is slidably positionable by the enlarged portion of the shaft between a seventh position, to align the slider valve to direct a pressurized refrigerant flow of the heated refrigerant to the at least one first housing port to displace the engine piston in the first direction, and an eighth position to align the slider valve to direct a refrigerant flow of the heated refrigerant to the at least one second housing port to displace the engine piston in the second direction.

2. The system of claim 1, wherein axial movement of the engine shaft moves a pump piston to compress a liquid refrigerant in an air conditioning system.

3. The system of claim 1, wherein the heat source is a solar collector.

4. The system of claim 1, wherein the engine shaft passes through the housing and axially reciprocates to power the compressor.

5. The system of claim 1, wherein the engine shifter assembly is axially movable such that the engine shifter assembly opens and closes the at least one first housing port and the at least one second housing port in response to the engine shifter assembly movement.

6. The system of claim 1, wherein the shaft extends through the housing and axially reciprocates to power a pump.

7. The system of claim 1, further comprising:
a condenser fan for cooling the condenser; and
a solar collector for powering the condenser fan.

8. The system of claim 1, wherein the heat source is the exhaust of a gas turbine.

9. A thermodynamic system for powering a reciprocating device, the thermodynamic system including a refrigerant passing in a closed loop between a refrigerant compressor, a condenser, and an evaporator, the thermodynamic system further comprising:
a heat source for heating the refrigerant; and
an engine for receiving the heated refrigerant, the engine including a housing that surrounds the engine, a shaft axially movable through the housing between a first position and a second position, an engine shifter assembly movable within the housing between a third position and a fourth position, an engine piston movable with the shaft between a fifth position and a sixth position; and
a shifter connected to a slider valve, the slider valve movable between a seventh position and an eighth position for reversing a direction of movement of the engine piston and the shaft, at least one first housing port in the housing alignable with at least one first engine shifter port in the engine shifter assembly for moving the heated refrigerant into and out of the engine, and at least one second housing port in the housing alignable with at least one second engine shifter port in the engine shifter assembly for moving the heated refrigerant into and out of the engine;
wherein the engine shifter assembly moves from the third position to the fourth position as a result of engagement with the engine piston as the engine piston moves with the shaft from the fifth position to the sixth position within the engine;
wherein the engine shifter assembly moves from the fourth position back to the third position as a result of engagement with the piston as the engine piston moves with the shaft from the sixth position back to the fifth position;
wherein the slider valve in the seventh position directs a pressurized refrigerant to the at least one first housing port and the at least one first engine shifter port to displace the engine piston in a first direction; and
wherein the slider valve in the eighth position directs pressurized refrigerant to the at least one second housing port and the at least one second engine shifter port to displace the engine piston in a second direction.

10. The system of claim 9, wherein axial movement of the engine piston and the shaft powers a compressor to compress liquid refrigerant in an air conditioning system.

11. The system of claim 9, wherein the shaft passes through the housing and axially reciprocates to power the compressor.

12. The system of claim 9, wherein the engine shifter assembly is axially movable such that the engine shifter opens and closes the at least one first housing port and the at least one second housing port in response to the engine shifter assembly movement.

13. The system of claim 9, wherein the shaft extends through the housing and axially reciprocates to power a pump.

14. The system of claim 9, further comprising:
a condenser fan for cooling the condenser; and
a solar collector for powering the condenser fan.

* * * * *